Nov. 15, 1938.   E. FRANKE   2,137,081

CAM FOLLOWER MECHANISM

Filed Aug. 22, 1936

Inventor:

Erich Franke

Patented Nov. 15, 1938

2,137,081

UNITED STATES PATENT OFFICE 2,137,081

CAM FOLLOWER MECHANISM

Erich Franke, Jena, Germany, assignor to firm of Carl Zeiss, Jena, Germany

Application August 22, 1936, Serial No. 97,416
In Germany September 12, 1935

2 Claims. (Cl. 74—54)

I have filed an application in Germany, September 12, 1935.

The invention concerns a cam follower mechanism of the kind in which a cam body rotatable about an axis displaces a contact lever radially according to a mathematical function of the changing angle of rotation of the cam body and of the changing distance of the surface of the cam body from the axis of this body. Such gears are frequently used in gunnery calculators for finding ballistic data or the like, and they have been so constructed that the cam body is rotatable about and displaceable parallel to its axis, and that the contact lever is rotatable only about an axis parallel to and at a finite or infinite distance from the axis of the cam body. This construction has quite a number of disadvantages, which are due mainly to the necessity of the gear having to overcome not only a rolling but also a sliding friction. Obviously, a lubrication not effected with utmost care and an imperfect protection against dust may cause the displaceable part to jam and, moreover, the gear is comparatively cumbersome and requires comparatively much driving energy.

According to the invention, which aims at overcoming these disadvantages, the cam body of the gear is rotatable only about its axis, and the contact body is rotatable about both an axis parallel and an axis at right angles to that of the cam body. The moving parts of the gear have to overcome, accordingly, only the friction of pivot bearings, which are devoid of the inconveniences inherent in straight line guidance, this friction being reduced to pure rolling friction when ball or roller bearings are used. In contradistinction to the known gear, in which the displacement of the contact lever is rectilinear relatively to the cam body at least in one direction, the relative movements in the new gear take place along two curved paths. As in the manufacture of the known gear, in which the rise of curve is taken into account, the rises of the curves to be described by the said movements require special attention also in the shaping of the cam body of the new gear. Obviously, it is convenient to have the rises of these curves assume comparatively small magnitudes. This can be achieved, as a rule, by disposing the axis of rotation at right angles to the axis of the cam body at such a distance from this axis as is greater than the distance apart of this axis and the axis of rotation parallel thereto.

Figure 1:
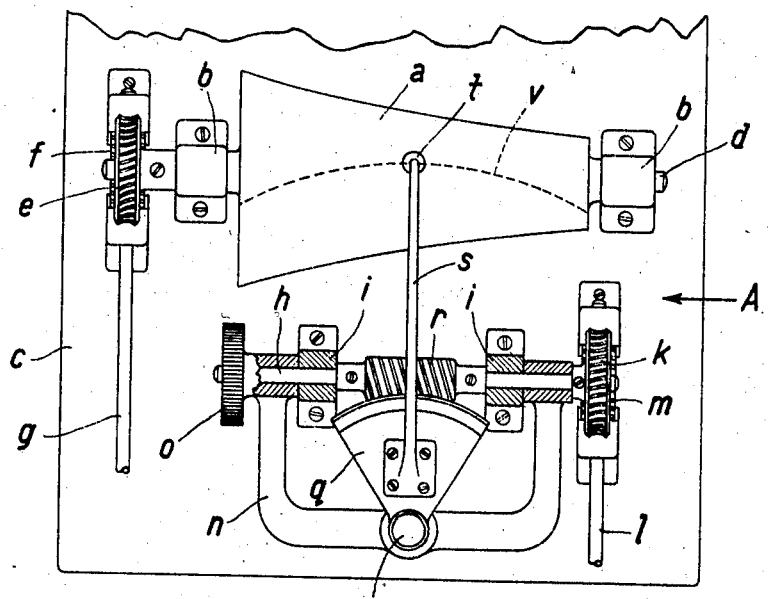
Figure 2:
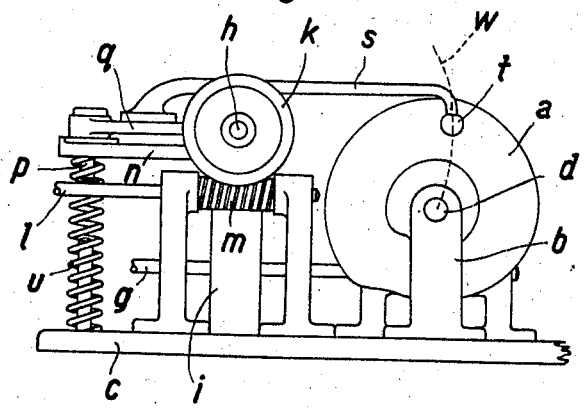

In the accompanying drawing, which illustrates a constructional example of the invention, Figure 1 represents a top view of the gear and Figure 2 is a view of the gear in the direction of the arrow A in Figure 1.

A cam body $a$ rests in two bearings $b$ supported by a base plate $c$ and is rotatable about an axle $d$ fast with a worm wheel $e$ in mesh with a worm $f$ on a shaft $g$. An axle $h$ parallel to the axle $d$ is mounted in two bearings $i$ and provided with a worm wheel $k$ in mesh with a worm $m$ fast with a shaft $l$. On the axle $h$ is rotatably mounted a bracket $n$ connected to and coaxial with a toothed wheel $o$. The bracket $n$ serves as a bearing for a rod $p$ at right angles to the axle $h$. To a worm wheel segment $q$ rotatable about the rod $p$ and in mesh with a worm $r$ fixed to the axle $h$ is connected the one end of a contact lever $s$ whose other end $t$ is spherical. To ensure that the spherical end $t$ of the contact lever $s$ is permanently in touch with the surface of the cam body $a$, a pressure spring $u$ is placed between the bracket $n$ and the base plate $c$.

The surface of the cam body $a$ is so shaped that the movements of the spherical part $t$ of the contact lever $s$ correspond to the product of a definite function of the angle of rotation of the shaft $g$ and a definite function of the angle of rotation of the shaft $l$, according to the rises of the curves $v$ and $w$ in which the said part $t$ is being displaced. A rotation of the shaft $g$ entails a rotation of the cam body $a$ about the axle $d$ and consequently, a movement of the part $t$ on the periphery of the body $a$. A rotation of the shaft $l$ entails a rotation of the worm $r$ on the axle $h$ and, consequently, a rotation of the worm wheel segment $q$ and the arm $s$ about the rod $p$. Accordingly, the part $t$ is displaced relatively to the axis of the cam body $a$. By correctly shaping the surface of the cam body $a$, it is attained that the movements of the part $t$ relative to the cam body $a$ correspond to the product of the desired functions of two movements imparted to the shafts $g$ and $l$, the sought product being continuously supplied by the toothed wheel $o$.

I claim:

1. A cam follower mechanism for mechanical reproduction of a mathematical function of the variable angles of rotation of two rotatable shafts, said mechanism consisting of a base plate, a cam body mounted on said base plate and rotatable about an axle, means for transmitting the angles of rotation of one of said two shafts to said cam body, a contact lever rotatably mounted on another axle, said other axle being at right angles to first said axle and so mounted on said base plate as to be rotatable about a third axle, said third axle being parallel to first said axle, means for transmitting the angles of rotation of said other shaft to said contact lever, and means for pressing said contact lever against said cam body.

2. In a mechanism according to claim 1, the distance apart of said other axle and the axle of said cam body being greater than the distance apart of the axle of said cam body and said third axle.

ERICH FRANKE.